United States Patent
Alasia et al.

(10) Patent No.: US 7,114,074 B2
(45) Date of Patent: Sep. 26, 2006

(54) METHOD AND SYSTEM FOR CONTROLLING ENCODED IMAGE PRODUCTION USING IMAGE SIGNATURES

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 20 days.

(21) Appl. No.: 11/018,347

(22) Filed: Dec. 21, 2004

(65) Prior Publication Data

US 2005/0177726 A1    Aug. 11, 2005

Related U.S. Application Data

(60) Provisional application No. 60/531,810, filed on Dec. 22, 2003.

(51) Int. Cl.
  *H04L 9/00* (2006.01)
  *H04N 7/167* (2006.01)
(52) U.S. Cl. .............. 713/176; 713/167; 713/182; 380/217
(58) Field of Classification Search ............... 713/176
  See application file for complete search history.

(56) References Cited

U.S. PATENT DOCUMENTS

| | | | |
|---|---|---|---|
| 4,914,700 A | 4/1990 | Alasia | |
| 5,420,924 A | 5/1995 | Berson et al. | |
| 5,438,429 A | 8/1995 | Haeberli et al. | |
| 5,668,874 A | 9/1997 | Kristol et al. | |
| 5,708,717 A | 1/1998 | Alasia | |
| 5,799,092 A | 8/1998 | Kristol et al. | |
| 5,867,586 A | 2/1999 | Liang | |
| 5,974,150 A | 10/1999 | Kaish et al. | |
| 6,104,812 A | 8/2000 | Koltai et al. | |
| 6,252,963 B1 | 6/2001 | Rhoads | |
| 6,343,138 B1 | 1/2002 | Rhoads | |
| 6,636,332 B1 | 10/2003 | Soscia | |
| 6,687,824 B1 | 2/2004 | Shin | |
| 6,707,915 B1 * | 3/2004 | Jobst et al. ............ 380/247 |

(Continued)

FOREIGN PATENT DOCUMENTS

EP    0598357 B1    5/1994

OTHER PUBLICATIONS

Liehua Xie et al. (Joint Wavelet Compression and Authentication Watermarking , IEEE 1998, pp. 427-431).*

(Continued)

*Primary Examiner*—Kambiz Zand
(74) *Attorney, Agent, or Firm*—Hunton & Williams, LLP

(57) ABSTRACT

An automated method for authorizing and controlling the production of optically encoded images is provided. The method comprises receiving from a user data processor a request for authorization to produce an encoded image. The authorization request includes user-supplied data comprising at least one authentication image file. The method further comprises determining whether the user is authorized to produce an encoded image using the user-supplied data. Responsive to a determination that the user is authorized to produce an encoded image using the user-supplied data, an authentication image signature is generated from the at least one authentication image file using an image signature algorithm and a positive authorization response is returned to the user data processor. The positive authorization response includes the authentication image signature.

19 Claims, 8 Drawing Sheets

U.S. PATENT DOCUMENTS

| | | |
|---|---|---|
| 6,707,927 B1 * | 3/2004 | Kita et al. .................. 382/100 |
| 6,895,507 B1 * | 5/2005 | Teppler ....................... 726/19 |
| 6,971,010 B1 * | 11/2005 | Abdel-Mottaleb .......... 713/176 |
| 7,010,144 B1 * | 3/2006 | Davis et al. ................ 382/100 |
| 2002/0042884 A1 | 4/2002 | Wu et al. |
| 2002/0054680 A1 | 5/2002 | Huang et al. |
| 2003/0012374 A1 | 1/2003 | Wu et al. |
| 2003/0136837 A1 | 7/2003 | Amon et al. |

OTHER PUBLICATIONS

Steinder et al (Progressively aunthenticated image transmission; IEEE 1999, pp. 641-645).*

* cited by examiner

METHOD AND SYSTEM FOR CONTROLLING ENCODED IMAGE PRODUCTION USING IMAGE SIGNATURES

RELATED APPLICATIONS

This application claims priority to U.S. Provisional Application No. 60/531,810, filed Dec. 22, 2003, which is incorporated herein by reference in its entirety.

BACKGROUND OF THE INVENTION

The invention relates generally to counterfeit protection for printed and digital documents, packaging and other printed materials, and more particularly to the secure production of encoded images for use in counterfeit protection measures.

Counterfeiting and alteration of valuable documents and black market sales of counterfeit goods are significant problems faced with increasing regularity in today's world. Each year many millions of dollars are lost through the fraudulent use of non-authentic documents and branded goods. The increasing sophistication of optical scanners, copy machines and other devices used for replicating items continues to enhance the counterfeiter's ability to produce fraudulent documents and other imitations which are of sufficient quality to often go undetected.

One method of providing increased security against unauthorized copying, alteration or counterfeiting is to apply an encoded image to the item to be protected. This image may include a visually apparent image (visible image) along with a non-visible or hidden image incorporated into the visible image in such a way as to be difficult or impossible to view without an optical or digital decoder configured specifically for viewing the hidden image. Application of such encoded images to documents and other items subject to counterfeiting allows the authenticity of such items to be readily verified by anyone having an appropriate decoder.

The content of encoded images can be widely variable and may be changed on a regular basis. The content may even be tied specifically to the individual item to which it is applied, in which case it must be generated very quickly in order to be considered a practical security measure. Accordingly, methods of producing encoded images should be flexible and preferably available to users on short notice.

It is therefore advantageous to make encoded image production readily available to individual users. Doing so, however, raises the concern that the encoded images themselves may be tampered with or produced by unauthorized users for application to counterfeit articles or altered documents. Another concern is that the authorized user can use the encoding software for non-authorized purposes, such as to protect printed material he is not allowed to encode. Accordingly, sophisticated control measures are required to assure that encoded images are produced only by authorized users and to assure that such authorized users produce only authorized encoded images.

SUMMARY OF THE INVENTION

Embodiments of the present invention fulfill a need for additional control over the production, transfer and use of encoded images used to protect documents and other materials from unauthorized reproduction, counterfeiting or other misuse.

An illustrative aspect of the invention provides an automated method for authorizing and controlling the production of optically encoded images. The method comprises receiving from a user data processor a request for authorization to produce an encoded image. The authorization request includes user-supplied data comprising at least one authentication image file. The method further comprises determining whether the user is authorized to produce an encoded image using the user-supplied data. Responsive to a determination that the user is authorized to produce an encoded image using the user-supplied data, an authentication image signature is generated from the at least one authentication image file using an image signature algorithm and a positive authorization response is returned to the user data processor. The positive authorization response includes the authentication image signature.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
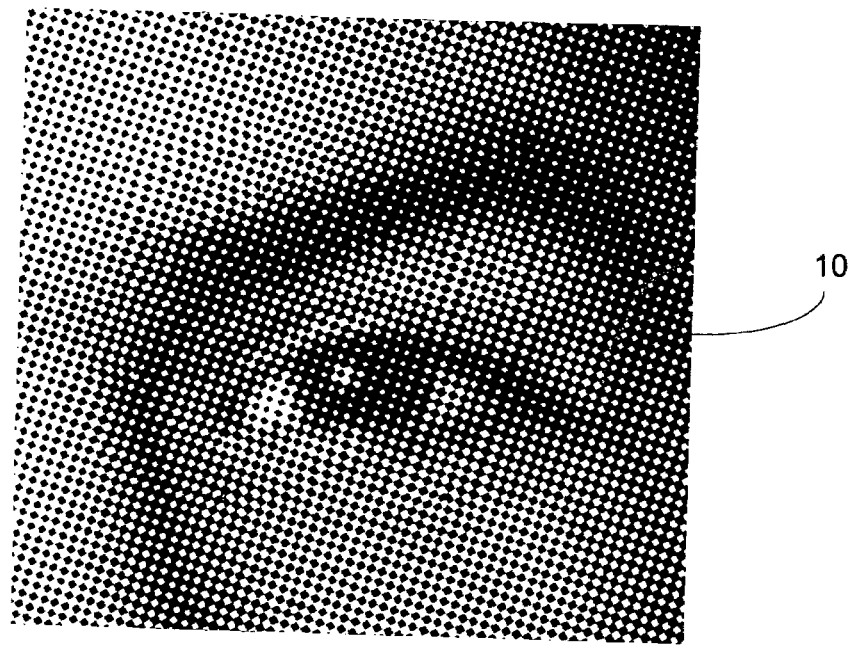
FIG. 1 illustrates an exemplary encoded image formed from primary and secondary authentication images.

Embodiments of the present invention provide methods for controlling the production, transfer and use of encoded images. As discussed above, such encoded images are used to discourage or prevent counterfeiting and misuse of documents and other materials to which the encoded images are applied.

As used herein, the term "encoded image" (or "optically encoded image") refers to a rasterized, scrambled or otherwise manipulated variation of one or more authentication images that, when embedded in a document, or in another printed background or source image, cannot be discerned from the base document material or other background or source image without the use of a decoding device. An encoded image may be generated from an authentication image using a particular set of characteristics that include encoding parameters corresponding to certain characteristics of the decoding device. When the encoded image is printed, placement of the decoding device over the printed encoded image in a predetermined orientation reveals the authentication image. Without the decoding device, some or all of the encoded image may be visible, but indecipherable or indistinguishable from the background by the naked eye.

It will be understood that optically encoded images may be digital images that are decodable by an optical decoding device if printed but that also may be decoded in their digital form using a digital decoding device such as a software-based decoder. Digital encoded images include encoded images that have yet to be printed or applied in physical form, as well as digital images that have been scanned or reproduced from printed encoded images. It will also be understood that optically encoded images may be printed or applied in such a way that they can be decoded only through the use of incident light in the non-visible spectrum or through the use of scanning devices operable to view light in the non-visible spectrum. Such encoded images includes those printed with a medium that emits or reflects light in non-visible wavelengths (e.g., infrared) or that emits or reflects when illuminated by light in non-visible wavelengths (e.g., ultraviolet).

As used herein, "authentication images" includes any image used in the production of an encoded image. An authentication image may therefore be an image provided for use as a visible background image or a secondary image provided for uses as a hidden image incorporated into a visible image.

Encoded images of particular interest to the present invention are those that are configured to be optically decoded using a lenticular lens. Such images are described in Alasia, U.S. Pat. No. 5,708,717 ("'717 Patent"), which is hereby incorporated by reference in its entirety. Such images take advantage of the ability of the lenticular lens to screen image content based on the lenticule frequency of the lens. These images are typically encoded by one of several methods that involve establishing a regularized periodic pattern having a frequency corresponding to that of the lenticular lens to be used as a decoder, then introducing distortions of the pattern that render the image difficult to discern with the naked eye.

Figure 2:
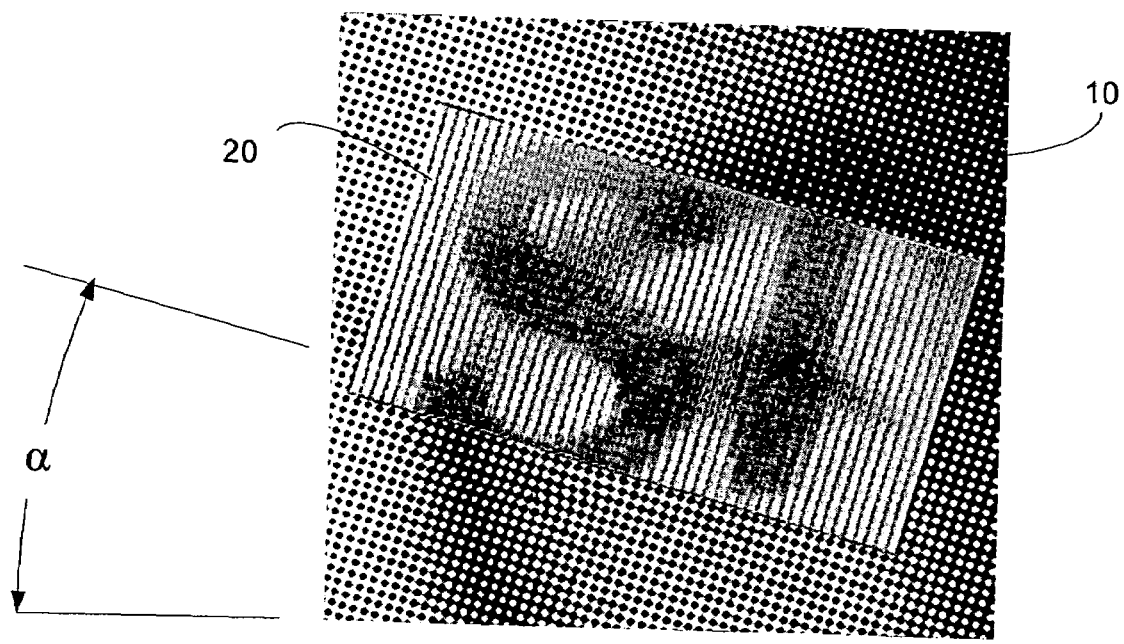
FIG. 2 illustrates the use of a lenticular lens decoder to decode the encoded image of FIG. 1.

FIGS. 1 and 2 illustrate the use of a lenticular lens to decode an encoded image. FIG. 1 shows an enlarged view of an optically encoded image 10. The encoded image 10 was constructed from a primary image of a human face and a secondary image of the letters "SI." The primary image was rasterized at a particular screen frequency and angle. The secondary image was embedded into the primary image by introducing variations in the raster lines at locations corresponding to the content of the secondary image. The result, as shown in FIG. 1 is an encoded image 10 in which the primary image is readily viewed but the secondary image cannot be discerned. As shown in FIG. 2, when a lenticular lens 20 having a line frequency corresponding to the screen frequency is placed over the encoded image 10 at the correct orientation α, the secondary image (SI) may be viewed. As discussed above, if the encoded image 10 is stored as a digital image or embedded in a digital document, a digital decoder with a similar functionality to the lenticular lens 20 can be used to decode the encoded image. If the encoded image 10 has been printed, an image acquisition device, such as a scanner or camera, can be used to create a digital version of the encoded image 10. The digital encoded image can then be decoded using software configured to extract the authentication image from the digital encoded image.

Encoded images of this and other types are constructed from digitized authentication images using a set of encoding parameters. These parameters may determine the configuration and orientation of the decoding device used to decode the encoded image. For images intended to be decoded by an optical decoding device, some or all of the encoding parameters may correspond to certain optical characteristics of the decoding device. For example, for images intended to be decoded by a lenticular lens, the encoding parameters may include a screen frequency, which corresponds to the number and spacing of regular screen segments into which an image is divided and the number and spacing of the lenticules of the lens. The encoding parameters may also include an angular orientation of the screen segments which determines the orientation at which the decoding device must be positioned relative to the image in order to decode the image.

In the discussions that follow, encoded images that may be decoded by lenticular optical decoding devices are used to illustrate the embodiments of the invention. It will be understood by those of ordinary skill in the art, however, that any image encoding method having a set of definable image characteristics and encoding parameters may be used in conjunction with the methods of the present invention.

As is discussed in co-pending applications U.S. application Ser. No. 10/847,943 and U.S. application Ser. No. 10/847,962 (collectively, "Copending Alasia Applications"), both of which were filed May 18, 2004 and are incorporated herein by reference in their entirety, some or all of the encoding parameters and authentication images used to construct an encoded image may be supplied by a user and some or all may be supplied by a separate party that actually carries out the encode image construction or that acts as a controller of encoded image production. Also, some of the image content or encoding parameters may be determined from the content of a document to which an encoded image is to be applied or in which an encoded image is to be embedded. As is also discussed in the Copending Alasia Applications, encoded images may be constructed using multiple sets of authentication images and encoding parameter sets. Each of these sets may be formed from different combinations of user-supplied and controller-supplied information (i.e., images and/or encoding parameters). For example, a first encoded image or portion of an encoded image may be constructed based on a user-supplied authentication image and user-supplied encoding parameters. A second encoded image or portion of the same encoded image may be constructed based on a controller supplied authentication image and controller-supplied encoding parameters.

Figure 3:
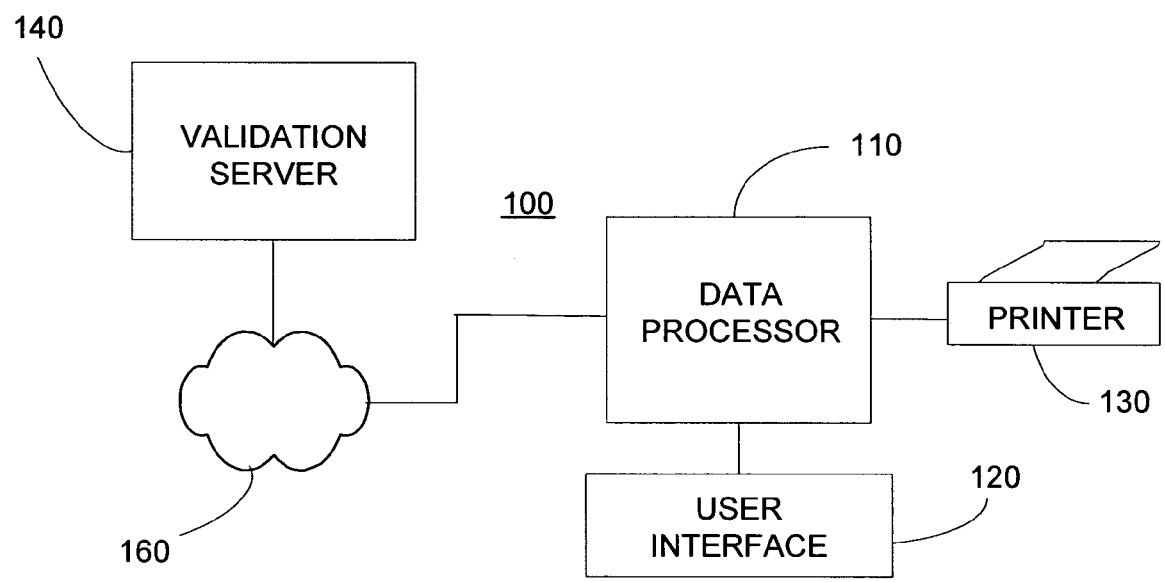
FIG. 3 is a schematic representation of an automated encoded image validation system according to an embodiment of the invention.
Figure 4:
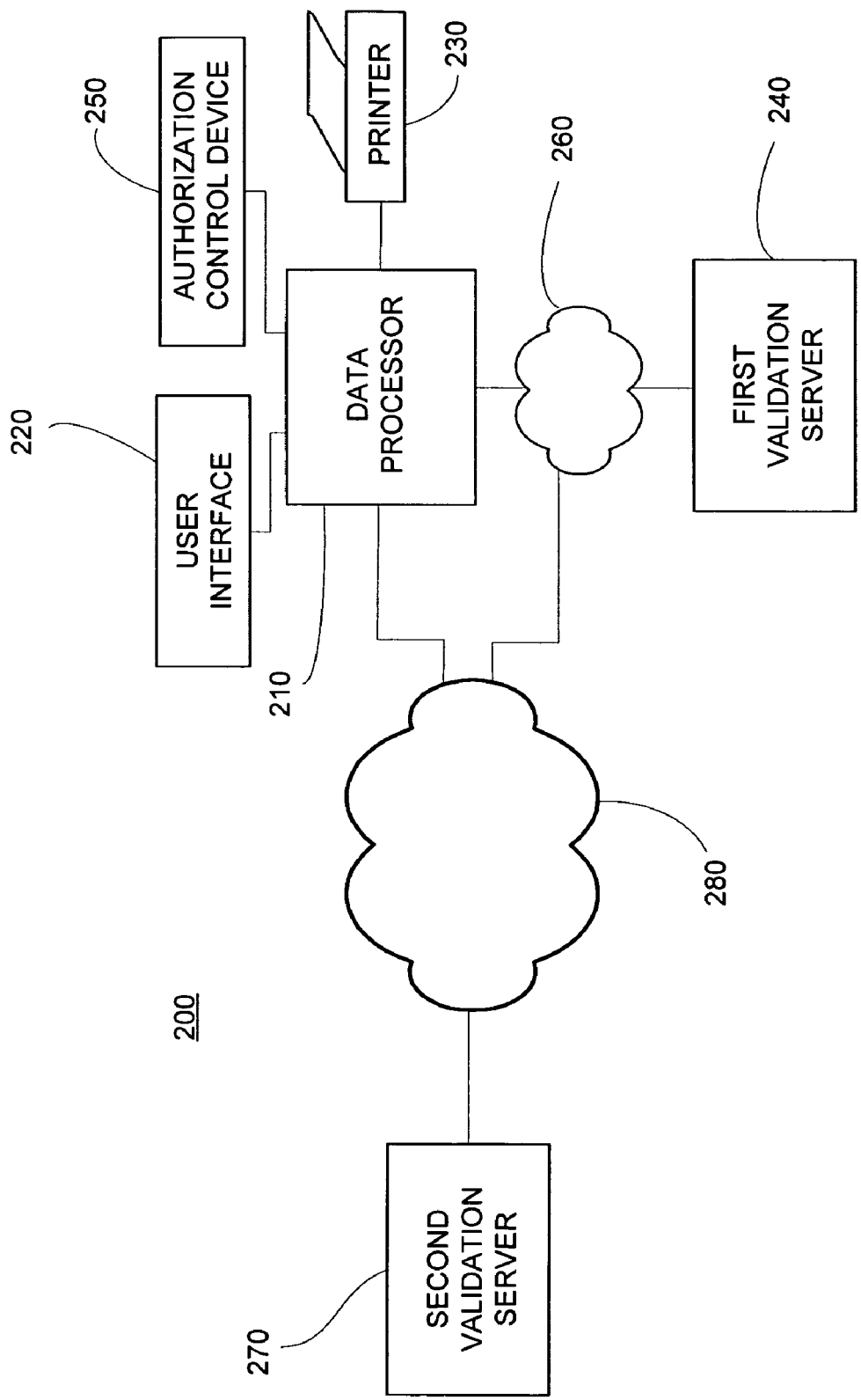
FIG. 4 is a schematic representation of another automated encoded image validation system according to an embodiment of the invention.

The use of controller-supplied images and/or encoding parameters allows a central controller to control some or all of the encoded image. The encoded image itself may be constructed by a central image encoding processor (which may be co-located with the central controller) and transmitted to the user's processor or may be constructed on the user's processor after authorization from a central control processor. FIGS. 3 and 4 illustrate systems for controlling the production of encoded images by requiring a user to obtain validation/authorization before an encoded image is produced.

With reference to FIG. 3, an automated encoded image validation system 100 comprises a user data processor connected to a validation server 140 through a network 160. The network 160 may, by way of example, be a local area network that connects a co-located validation server 140 to a plurality of data processors 110. Alternatively, the validation server 140 may be remotely located relative to the data processor 110, the two being connected or connectable via the Internet or other wide area network. In either case, the user data processor 110 may be one of a plurality of user data processors and may be connected to a user interface 120 and a printer 130. The encoded image validation system 100 may also include an authentication control device (not shown) attached to or in communication with the user data processor 110. As is described in the Copending Alasia Applications, such devices may include a separate processor or electronic security key that controls local processing of software on the user processor 110.

The automated document authentication system 100 may be used to carry out any or all of the actions required to construct an encoded image. It will be understood that these actions may be divided up so that some or all of the actions are carried out as part of an interactive transaction conducted between the user data processor 110 and the validation server 140. It will also be understood that one or more of the actions of the methods of the invention may be carried out by the user data processor 110 while one or more additional actions are carried out by the validation server 140.

In an exemplary embodiment, an interactive session may be established between the user data processor 110 and the validation server 140. As part of this transaction, the user may submit to the validation server 140 one or more authentication images and/or one or more user-supplied encoding parameters. These may then be used by the validation server 140 to produce an encoded image that is returned to the user data processor 110, where the encoded image is embedded into a document and stored or printed to produce an authenticated printed document. Additional non-user-supplied authentication images and/or encoding parameters may be incorporated into the encoded image by the validation server 140.

In another exemplary embodiment, the user may submit an entire document to the validation server 140, which creates and embeds an encoded image into the document and returns it to the user data processor 110 for printing or storage. Along with the document, the user may submit one or more authentication images and/or one or more user-supplied encoding parameters for the validation server 140 to use in creating the encoded image.

In some embodiments, some or all of the actions required to produce an encoded image may produced by a second server. This provides for separation of the validation and image encoding tasks and also allows for multiple levels of authorization and control. With reference to FIG. 4, an automated encoded image validation system 200 includes a first validation server 240 connected to a user data processor 210 through a first network 260. The first network 260 may, for example, be a local area network and the first validation server 240 may be co-located with the data processor 210. Alternatively, the first validation server 240 may be remotely located relative to the data processor 210. In either case, the user data processor 210 may be one of a plurality of user data processors and may be connected to a user interface 220 and a printer 230. An authentication control device 250 may also be attached to or in communication with the user data processor 210.

The user data processor 210 may be adapted to carry out one or more of the actions associated with encoding an image. However, the user data processor 210 may carry out these actions only upon receiving authorization from one or both of the first validation server 240 and a second validation server 270.

The first validation server 240 may be programmed to monitor and control the processing of encoding actions on the user data processor 210. For example, the first validation server 240 may be configured to receive from the user data processor 210 a request to encode an image using certain user-supplied encoding parameters and/or authentication indicia. The first validation server 240 may be further programmed to verify that the user and the user data processor 210 are authorized to carry out the encoding process using these encoding parameters and indicia. This verification is conducted using a first set of authentication criteria that may be established, at least in part, by the management entity controlling the first validation server 240. Upon concluding that the request meets the first authorization criteria, the first validation server 240 may return an authorization approval to the user data processor 210. The user data processor 210 may then send the request or a modified form of the request to the second validation server 270 via the second network 280. Alternatively, the first data processor 240 may send the request or a modified form of the request directly to the second validation server 270.

The second validation server 270 is in communication with or selectively in communication with either or both of the user data processor 210 and the first validation server 240 via the second network 280. It will be understood that the second network 280 may be the same network as the first network 260 or may be a different network. In an illustrative embodiment, the first network 260 is a local network while the second network 280 is the Internet. In another embodiment, the user data processor 210, the first validation server 240 and the second validation server 270 are all interconnected via the Internet.

The second validation server 270 may be programmed to receive and evaluate encoding authorization requests from any of a plurality of user data processors 210 and first validation servers 240. The second validation server 270 may have a variety of user-associated or customer-associated authorization criteria that may be compared to the data received in an authorization request from a user data processor 210 or first validation server. The second validation server 270 may be adapted to verify that the user and the user data processor 210 are authorized to carry out the encoding process using the encoding parameters and indicia submitted in the authorization request. This verification may be conducted using a second set of authentication criteria that may be based on the terms of any usage agreement established with the using entity or organization. These criteria may include limits on the encoding parameters that may be used, limits on the number of times the encoding software may be used or how long it may be used (base on an expiration date, for example), limits on the number of encoded images that may be produced and limits on the content of user-supplied authentication indicia. Upon concluding that the request meets the second authorization criteria, the second validation server 270 may return an authorization approval to the user data processor 210 and/or the first validation server 240. At the same time, the second validation server 270 may provide certain non-user-supplied encoding parameters and/or authentication indicia to be used by the user data processor in constructing the requested encoded image.

It will be understood that the various encoding actions of the previously described authentication methods may be divided up so that some or all of the actions are distributed between the user data processor 210 and the first and second validation servers 240, 270. It will also be understood that one or more of the actions of the methods of the invention may be carried out by the user data processor 210 while one or more additional actions are carried out by the validation servers 240, 270 as part of or in conjunction with the verification/authentication process.

Figure 5:
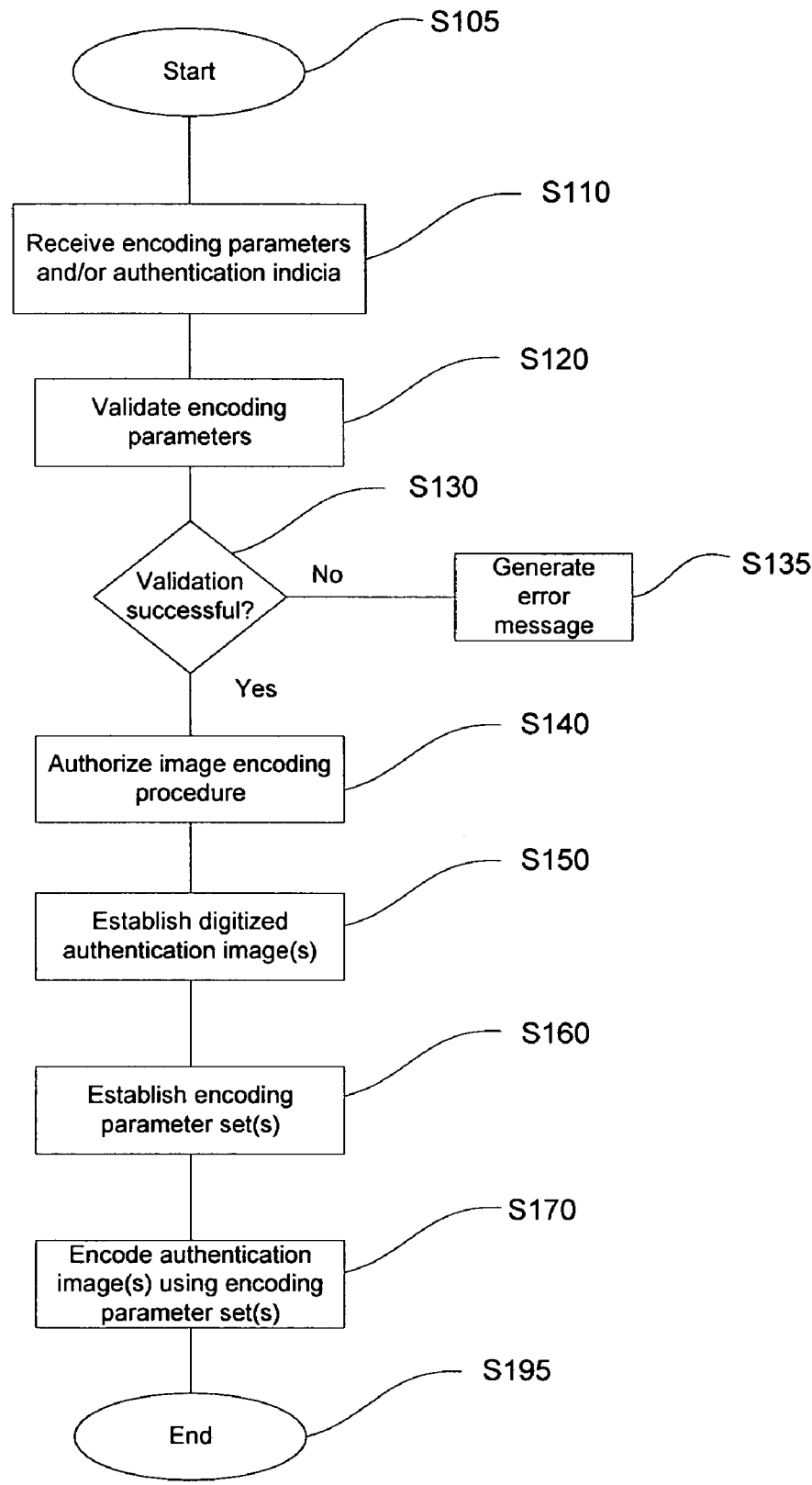
FIG. 5 is a flow chart of a method of controlling an encoded image production process according to an embodiment of the invention.

FIG. 5 illustrates a general method of controlling the production of encoded image according to an embodiment of the invention. The method begins at S105, and at S110, encoding parameters and variable indicia are received by the data processor running the authentication software. These may include any combination of user-supplied and non-user-supplied authentication image indicia and/or encoding parameters. At S120 and S130, a verification is conducted to determine if the encoding parameters requested by and/or provided by the user fall within previously established authorization criteria. These criteria may, for example, include predetermined limits on the encoding parameters that the user may submit. For example, a user may be permitted to choose only a certain screen frequency or orientation of an authentication image.

The verification criteria may be established based on terms of use agreed to by the user. In addition to limits on encoding parameters or authentication indicia, the verification criteria may include a limit on the number of uses of the authentication software or the number of encoded images that may be produced. In either case, an actual number of uses or images may be incremented each time the software is used. Alternatively, a time-based limit such as an expiration date may be included.

The authentication software may be configured so that an attempt by a user to exceed usage limits or to use encoding parameters or indicia that are outside the terms of use for that user will result in an error message being displayed at S135. The error message could be displayed, for example, if the user requests an encoded image having a screen frequency outside the range assigned to the user, if the actual number of uses would exceed the usage limit for the user, or if the authentication image does not satisfy predetermined criteria related to its content or dots-per-inch resolution. Upon determining that the authorization criteria have not been met, the method may be terminated. Alternatively, the user may be prompted to provide input meeting the authorization criteria.

If the authorization criteria are met, the encoding procedure is authorized at S140. The authentication indicia may then be used to establish a digitized authentication image (or images) at S150. If necessary, some or all of the authentication indicia may be rendered to form a digitized image. The authentication images may also include non-user-supplied authentication indicia. At S160, the encoding parameters are assembled into an encoding parameter set, which may be used to encode the authentication image(s) at S170. The encoding parameter set may include non-user-supplied encoding parameters in addition to any user-supplied encoding parameters. The resulting encoded image may be stored or embedded into a document as previously discussed. The method ends at S195.

Figure 6:
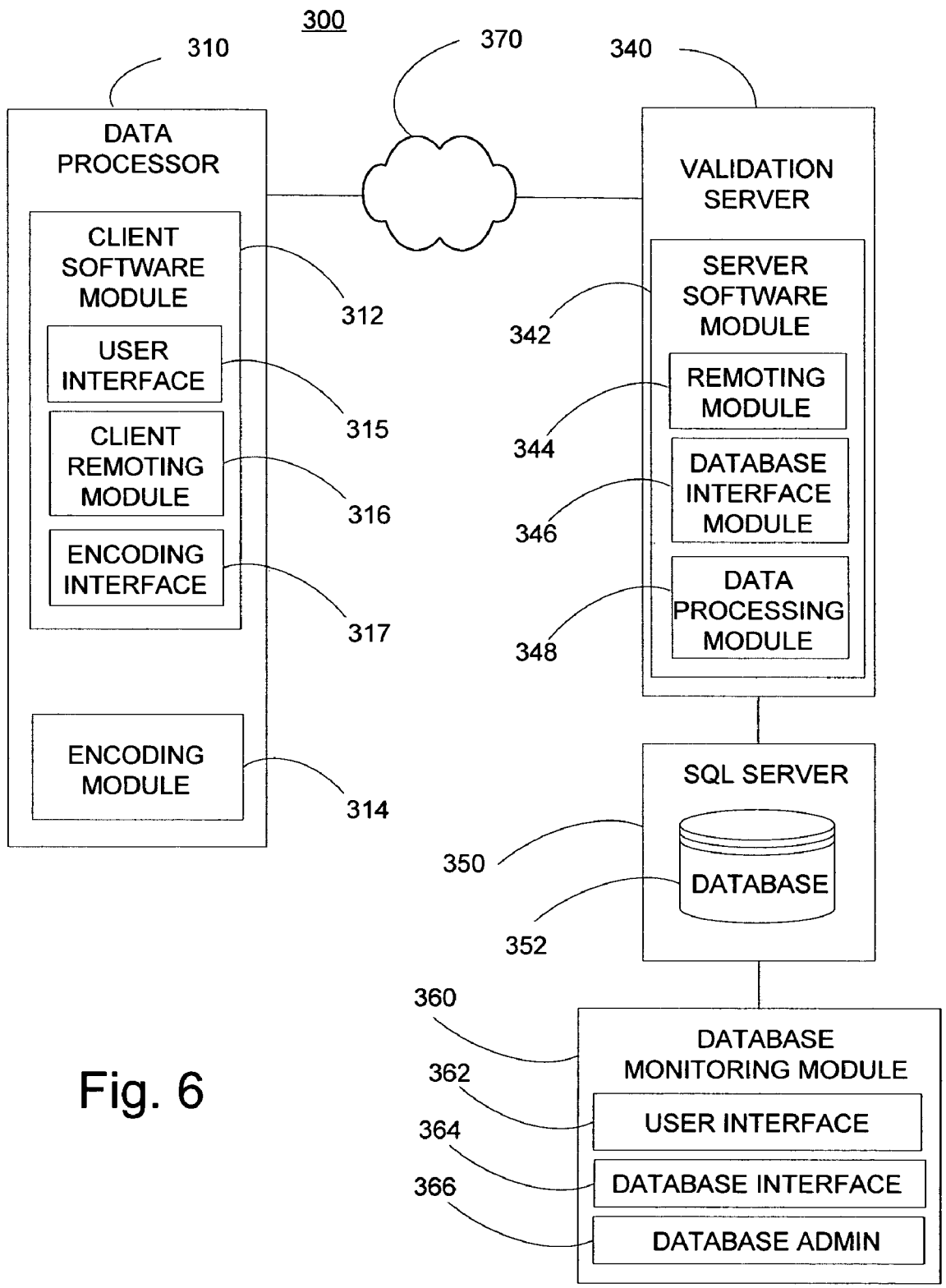
FIG. 6 is a schematic representation of an automated encoded image validation system according to an embodiment of the invention.

As noted above the validation and encoding process steps may be divided among multiple processors including a user data processor and one or more validation servers. FIG. 6 illustrates an exemplary encoded image validation system 300 that is similar to the system 100 of FIG. 3. The validation system 300 has a user data processor 310 that may be selectively connected to validation server 340 through a network 370. As illustrated in FIG. 6, the validation methods of the invention may be carried out using three primary software modules: a client software module 312, a validation module 342, and an encoding module 314. These modules may themselves comprise one or more submodules to perform particular functions within a module or interface with other modules. In the illustrated embodiment, the client software module 312 and the encoding module 314 are resident on the user data processor 310 and the validation module 342 is resident on the validation server 340. It will be understood that the encoding module 314 may alternatively reside on a separate encoding processor in communication with the user data processor 310 over the network 370 or over a different network.

The client software module 312 may be configured to receive input from the user and is typically executed from the user data processor 310. The client software module 312 may be adapted to use a graphical user interface through which the user may input data for transmission and operation by the server software and encoding modules 314, 342. Input from the user might include the authentication images that the user wants to use as visible and/or hidden images in the creation of an encoded image. It may also include user-specified encoding parameters such as the screen frequency or resolution of the original images and the desired encoded image.

The client software module 312 may be adapted for accepting the user input and formulating a request for authorization to produce an encoded image based on that input. This request can be transmitted to the validation server as described in the previously discussed validation methods. The client software module 312 may also be adapted to compress the authentication image files that have been identified for use in creating the encoded image. Compression of an authentication image produces a compressed or "thumbnail" authentication image. The original authentication image (and the resulting compressed image) may be any type of image file, such as bitmap, JPEG, TIFF or GIF images. Thumbnail authentication images may be transmitted to the validation server 340 along with the encoding validation request, and, as will be discussed in more detail hereafter, can be used by the validation module 342 to generate an image signature that can be used in a second level of verification.

In the validation system 300, the client software module 312 requests authorization from the validation module 342 and subsequently calls upon the encoding module 314 to create an encoded image using the authentication images and encoding parameters approved by the validation module 342. It will be understood that while the client software module 312 may be resident on and executed by the user data processor 310, it may alternatively be resident on a remote server (which may be the validation server 340) accessed by the user via a web browser or a dedicated client software module. In this case, the software executed on the user data processor 310 may be limited to a user interface used to submit information to request validation and construction of an encoded image.

Figure 7:
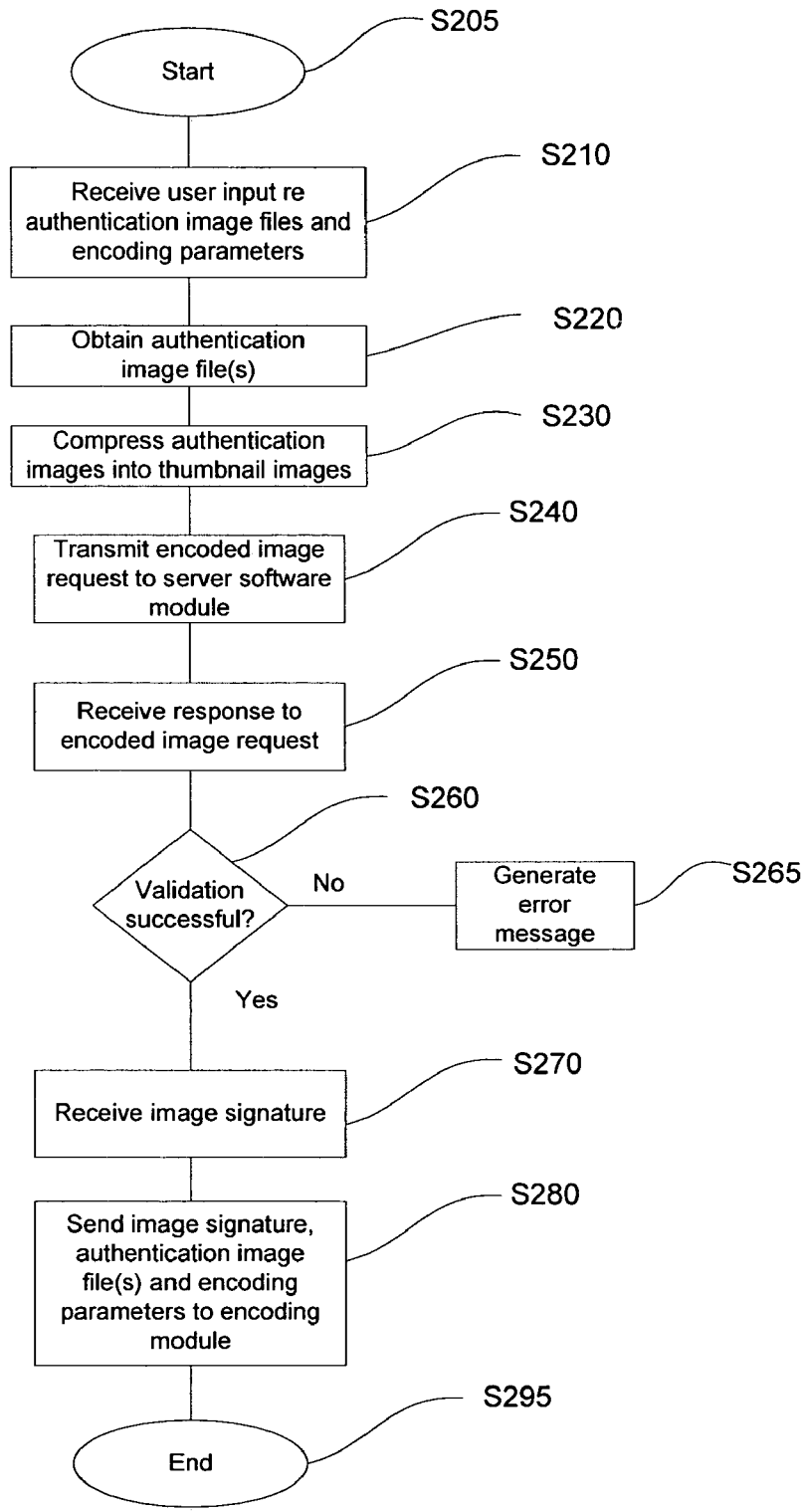
FIG. 7 is a flow chart of a method of controlling an encoded image production process according to an embodiment of the invention.

FIG. 7 illustrates a flow diagram of a of a process of obtaining an encoded image from the perspective of the user data processor and, in particular, the client software module. The process begins at S205. At S210, information relating to the desired image encoding is received from a user through a user interface. The user may also provide user credentials, such as a username and password, which may optionally be required in order to obtain authorization of an encoded image. The information provided by the user may identify one or more authentication images to be used for the encoded image. These images may be stored in image files identified in any typical manner of selecting a file from any data storage medium. The user information may also include encoding parameters to be used in encoding the authentication image(s).

At S220, the one or more authentication images are obtained by the client software module. The images will typically be obtained by retrieving them from storage based on information provided by the user. Alternatively, they can be rendered from the user-provided data. The authentication images may then be compressed into thumbnail images at S230. The thumbnail images, along with the user credentials (if required) and the encoding parameters are then transmitted as an encoded image authorization request to a validation server at a location that may be remote from the user processor. It will be understood by those of ordinary skill in the art that the images sent with the encoded request could alternatively be sent in uncompressed form. It has been found, however, that there are significant processing and transmission speed advantages in using compressed image files.

As discussed in more detail below, the validation module on the validation server verifies the user credentials and the encoding parameters and returns an authorization response. If an encoded image is authorized, the validation module may also return one or more image signatures generated from the authentication image and encoding parameters received in the request. In some embodiments, the validation module will also return non-user-supplied encoding parameters for use in constructing the encoded image. In some of these embodiments, the validation module may also supply a non-user-supplied authentication image for use in encoding an additional encoded image over which the user does not have control.

At S250 and S260, the client software module receives the authorization response from the validation server. If the authorization response is negative, an error message is generated at S265 and returned to the user. This message may inform the user as to why the authorization was negative an/or may indicate that the user is to be given another opportunity to request authorization for the image creation. If the authorization response is positive, at S270, image signature(s) may also be received from the validation module. The client software module then calls the encoding module and passes to it, at S280, the image signatures received from the validation module along with the original, uncompressed authentication image files, the encoding parameters designated by the client prior to requesting authorization and, if appropriate, any encoding parameters or authentication images received from the validation module. As will be discussed in more detail below, the encoding module performs a final validation procedure and, if the result is positive, constructs the requested encoded image. The process ends at S295.

The validation module may be configured to receive and validate encoded image requests. Validation may include verifying that the user is an authorized user of encode images, generally and whether that user is authorized to receive or produce the requested encoded image. It will be understood that the functions of the validation module may be executed by a single validation server or may be spread across plurality of servers, any or all of which may be remote from the user data processor. The validation server(s) may be hosted by an application such as Internet Information Server from Microsoft, for example.

Figure 8:
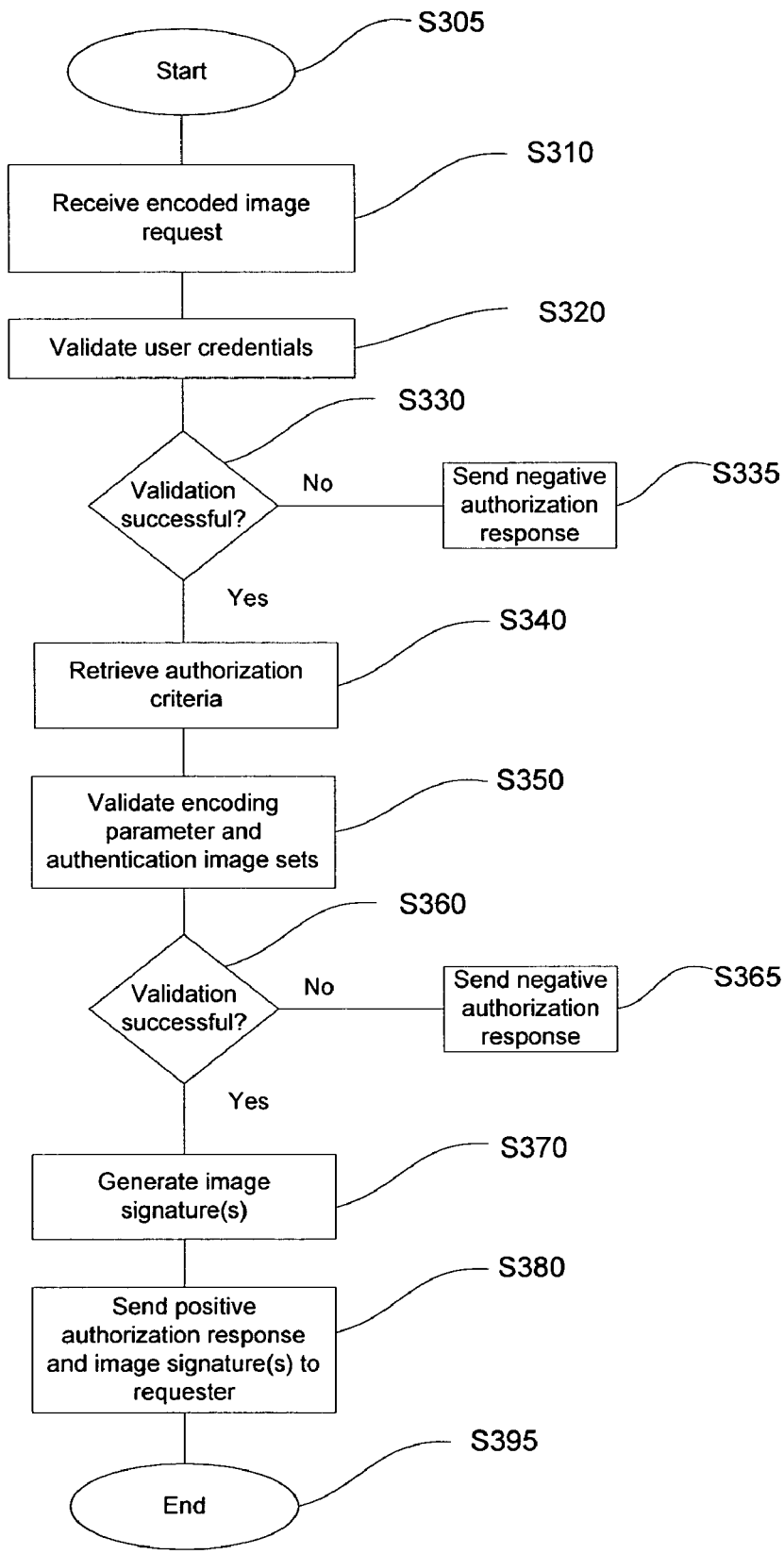
FIG. 8 is a flow chart of a method of controlling encoded image production process according to an embodiment of the invention.

FIG. 8 illustrates a flow diagram of a of a process of validating an encoded image request from the perspective of the validation server and, in particular, from the perspective of the validation module. The method begins at S300. At S310, an encoded image request is received from an encoded image requester via user data processor. The encoded image request may include requester identification information such as a username and password as well as image information relating to the encoded image or images requested.

As discussed above, the image information may include either or both user-supplied authentication images and user-supplied encoding parameters. Using information from a user database, the requester identification information can be used to verify that the requester is a valid system user at S320 and S330. If the username and password are not valid, a negative validation response is returned to the requester at S345. If the username and password are valid, a set of predetermined validation criteria for the requestor are retrieved from data storage at S350. At S360, the images and encoding parameters received from the requester are compared with the validation criteria. If the requested encoding parameters are not within the ranges specified in the validation criteria, a negative validation response is returned to the requester at S345. If the requested encoding parameters are within the ranges specified in the validation criteria, the requested encoded image creation is authorized and a positive validation response is returned to the requestor At S380. For future verification purposes, the validation module may store a log of each user's activity in the user database. As shown in the exemplary system 300 of FIG. 6, a user database 352 may be established on a separate database server 350 such as an SQL server.

As noted above, the positive validation response may also include non-user-supplied authentication images and/or non-user-supplied encoding parameters that will be incorporated into the requested encoded image. As an additional security precaution to prevent later attempts by the requestor to change the authentication images or the encoding parameters after authorization, the positive validation response sent to the requestor at S380 may include an image signature generated at S370 from the authentication images passed to the validation module in the encoded image request. As used herein, "image signature" means any unique numerical calculation or graphical representation that is calculated or constructed from an image using a predetermined signature algorithm and that can be used to compare the content of one image to the content of another image.

In the method of the present invention, image signatures generated by the validation module using a particular signature algorithm may be passed to the requestor's user processor where they are received by the client software module and forwarded to the encoding module. As will be discussed, the encoding module uses the same signature algorithm to generate comparison signatures from the authentication images it receives from the client software module. It can then compare the comparison signatures to the signatures received from the validation module to determine if the authentication images and/or encoding parameters have been changed.

The encoding module is the portion of the system that is executed to create an encoded image using the authentication images and encoding parameters. The encoding module may execute locally with respect to the client software module, such as via software installed on the user's computer. Alternatively, the encoding module may execute remotely, such as on the computer used to host the validation module. Determining whether the encoding module should execute locally or remotely may depend on the size of the encoded images created. The system is capable of creating encoded images that are of both high and low resolution.

A local execution of the encoding module may be preferable when the encoded image is to be produced from high resolution authentication images. In such instances, remote execution would require the original and encoded images to be transmitted across a network, which could result in the user experiencing long times to send original images and receive encoded images. High resolution encoded images used in exemplary embodiments of the invention may be up to 1 GB or larger in size. Thus, remote encoding may involve prohibitively high processing times. If, however, data transfer speed is not a concern or if bandwidth is sufficient to transfer even large files quickly, then remote encoded image creation may be a desirable alternative.

The client and validation modules are typically developed using interpreted languages, such as Java, or managed code, such as Microsoft .NET, that may not provide for sufficient data processing speed and security against decompiling. Because of this, the encoding module preferably uses a precompiled, highly optimized set of image processing functions from image processing code, written in C, C++ or assembly language, and which might be additionally wrapped in a security envelope, such as one provided by Aladdin Systems. This may provide for increased processing speeds during the encoded image creation process, as well as provide additional security from attempts to decompile the image processing code.

Figure 9:
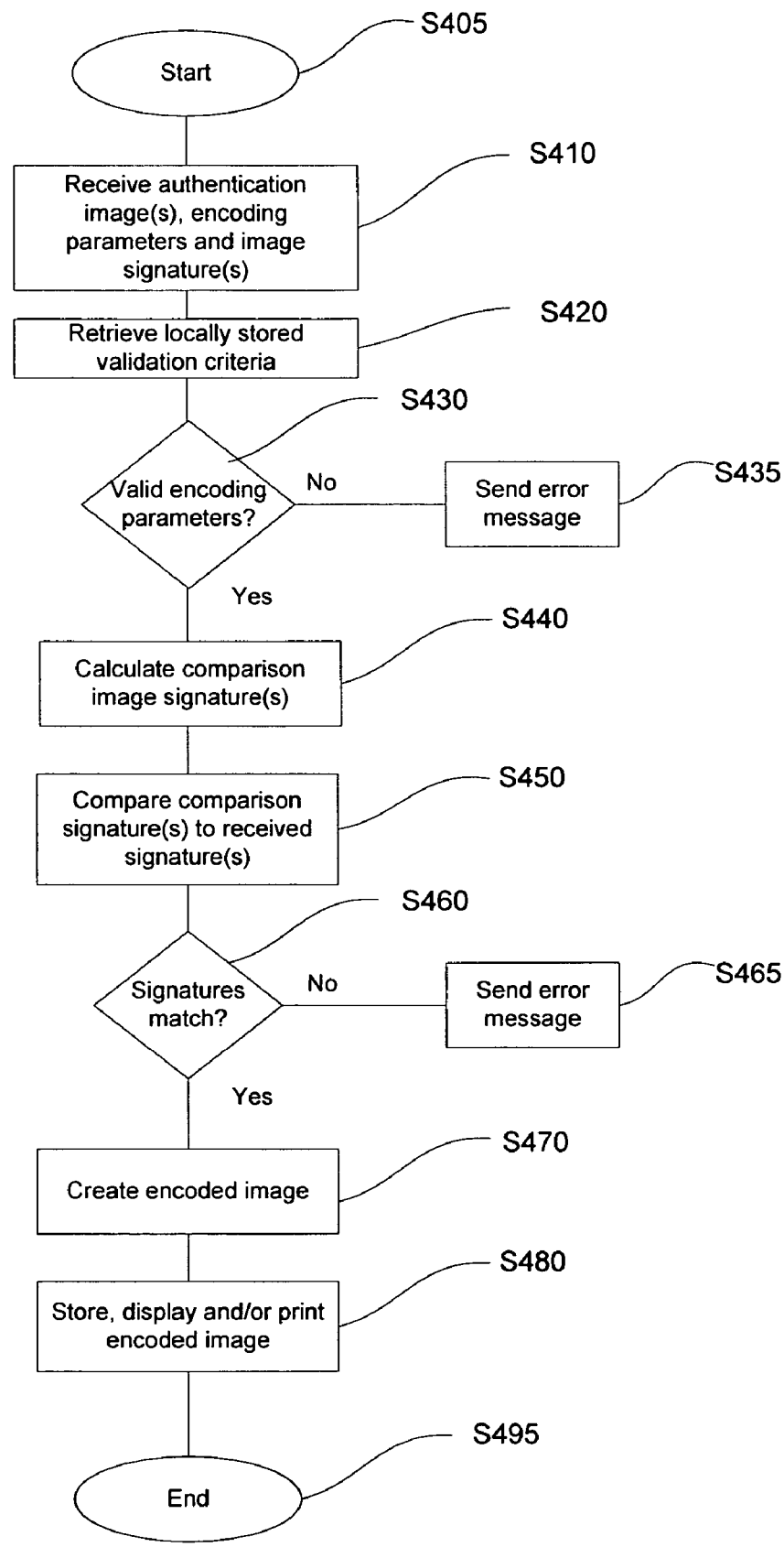
FIG. 9 is a flow chart of a method of controlling an encoded image production process according to an embodiment of the invention.

An exemplary method of producing a validated encoded image from the perspective of the encoding module is shown in FIG. 9. The method begins at S400 and at S410, the encoding module receives the image signatures passed from the validation module, along with the actual, original (i.e., non-compressed) images identified by the user as the authentication images to be used for creating the encoded image. The encoding module also receives the encoding parameters validated and/or provided by the validation module when the encoded image creation was authorized.

Upon receiving the image and encoding parameter information, the encoding module may optionally retrieve locally stored validation criteria that is not accessible to the user. In cases where the encoding module is located in a user data processor, validation criteria may be stored, for example, in a hardware key attached to the user data processor. The hardware key may have a separate memory that is accessed by the computer to verify that the encoding parameters are within the criteria stored on the hardware key. This assures that the encoding parameters are not altered after validation by the validation module. The hardware key may also include limits on the use of the encoding module based on a predetermined number of uses available to the user or based on an expiration date.

The encoding module retrieves the locally stored validation criteria at S420 and validates the encoding parameters against these criteria at S 430. If this validation step is not successful, an error message is returned at S435. If validation is successful, the encoding module independently calculates at S440 a comparison image signature (or signatures) from the original images passed to the encoding module by the client module. The comparison image signature is calculated using the same algorithm used by the validation module to calculate the image signature for the images sent to the validation module. The image signature(s) created by the encoding module are then compared at S450 against the one(s) passed to the encoding module from the validation module. If the signatures do not match within a certain, pre-determined tolerance, an error message is returned at S465. If the signatures match within the pre-determined tolerance, then the final authorization for creating the encoded image is granted and the encoded image is created at S470. At S480, the newly created encoded image may then be saved to a data storage medium such as a disk for later access in creating printing plates. Alternatively or in addition, the encoded image may immediately be displayed or printed. The method ends at S495.

If the images supplied to the validation module for validation are provided in compressed format, the tolerance range for signature matching should be established so as to account for differences between an image signature created from an original image file versus one created from a compressed image file, such as the image signatures created by the validation module. Alternatively, the encoding module may include the additional step of compressing the authentication images prior to calculating the comparison signatures. Another alternative is to have the client software provide compressed images to the encoding module along with the uncompressed images. The encoding module would use the compressed images to calculate comparison signatures and the uncompressed images to produce the encoded image.

The system 300 of FIG. 6 may also include a database monitoring module 360. For enhanced security, the database monitoring module 360 may be a standalone module outside of the call functions connecting the client software, server software, and encoding modules 312, 314, 342. The database monitoring module 360 may be executed by a single workstation or over a secure local network that in either case preferably has access only to the server database to keep the database monitoring module 360 separate from the other portions of the system 300. The database monitoring module 360 can be used by a party other than the user to access and update information stored in the server database 352, such as adding or expanding authorized encoding parameters for a particular user and other managerial functions useful in servicing the database 352.

The system 300 may be established in any development environment, such as Java or Microsoft.NET, for example. Likewise, the programming model may use any available model, although three widely available options include ASP.NET, .NET Remoting, and Web Services. For example, a model built with ASP.NET or Web Services may be preferable if a large number of encoding requests and many client access points on diverse computing systems are anticipated. However, .NET Remoting may be preferable for more controlled, lower volume, custom-built applications, which are typically associated with high-resolution images for the protection of packaging, currencies, stamps, tickets etc.

Each module of the system may comprise one or more submodules designed to perform certain functions within a particular module of the system. For example, the client software module 312 may include a user interface module 315, a client remoting module 316, and an encoding interface module 317.

The user interface module 315 may be a graphical user interface. This interface is the portion of the system that the client sees on his computer screen and that is used to collect encoding and communication parameters. Encoding parameters may include the number or orientation of the encoded images to be created, while communication parameters may adjust how the client software module connects with the validation module 342 to authorize the creation of the encoded images.

The client remoting module 316 of the client software module 312 manages communications with the validation module 342. Similarly, the encoding interface module 317 communicates with the encoding module 314 and is responsible for passing information to the encoding module 314 received by the client software module 312 from the validation module 342 as well as the information from the client software module 312 itself. It can also send information from the encoding module 314 back to the client software module 312, such as encoding progress information, or encoding error messages.

The validation module 342 may include submodules such as a server remoting module 344 that manages communications to and from the client software module 312 and a database interface module 346 that manages communications with the server database 352 to log client activity on the validation server 340. The validation module 342 may also include a data processing module 348 that processes information received by other modules and submodules of the system 300.

If a database monitoring module 360 is used, it may also include several submodules. Typical submodules may include a user interface module 362 for use by the party accessing the monitoring application module to view database records, client reports, and other stored information. A database interface module 364 manages communications with the database 352 to retrieve information provided to the user interface module 362. A database administration module 366 may be used to handle administrative functions, such as storing usernames and passwords, performing database backups and other administrative type functions useful for the maintenance of the database 352.

The functions of the primary software modules discussed above may be executed in various combinations on different computers to create a multi-furcated system that separates the software modules into client-side and business-side applications. It will be understood that one or more users may access the system through computers connected to the Internet. It should be appreciated that although the Internet may be the most readily accessible network over which the modules of the system communicate, any network of computers may be used. As discussed previously, if the user computers include the encoding module, the computers may also have a security key attached, such as the HASP key available from Aladdin Systems.

User computers carrying out the methods of the invention may connect to a web server across the Internet through a first firewall. The web server can then access information in a database server through a second firewall to obtain and/or record information. The database server may also be connected to a monitoring module that may include one or more workstations and an exchange server useful for accessing the database server to monitor the status of incoming and outgoing communications from the database server.

The systems and methods of the invention provide multiple levels of security with respect to preventing unauthorized use by a counterfeiter or keeping a user from creating encoded images outside of the authorized encoding parameters may be accomplished in several ways. Additional protection may be established through the use of a hashing function to create the described image signatures for the images that the user intends to use to create the encoded image. A hashing function assigns a compact digest or signature to transmitted data that may then be compared against an independently created signature to analyze whether or not the data was tampered with during transmission. Some examples of hashing functions known in the art are MD2, MD4, MD5, SHA, and SHA-1.

As discussed above, in some embodiments of the invention, an authentication image designated by the user is transmitted to the server software module in thumbnail (i.e., compressed) form. During verification, the server software module produces a signature for the transmitted image and returns it to the user along with the verification. The encoding module independently produces a signature for the same but uncompressed image, which may then be compared against that returned by the server software module. If the image the user attempts to use for creating an encoded image is not the same as that authorized by the server, the signatures will not correspond and the system will not process the request to create the encoded image.

Any signature algorithm may be used in the methods of the present invention. There are, however, certain signature characteristics that enhance the security performance and processing speed of the invention. When dealing with high-resolution images, for example, an image signature is preferred that does not change significantly when the image is subjected to strong and/or poor fidelity image compression. Such compression is often desirable in order to reduce the amount of information that must be exchanged over a network during the remote verification process. The signature calculation also preferably has a high execution speed to avoid unnecessary delays in receiving the server response, delays in the pre-encoding signature calculation or in the comparison of the signature created in the server software module. Notwithstanding the desirability of the above characteristics, the signature algorithm should also be sensitive enough to allow detection of significant modifications to the images. The hashing functions mentioned above may be extremely sensitive to any modification of the protected image, but also have low tolerance to poor compression algorithms. Signatures based on the image content descriptors, including, but not limited to morphological features, color and brightness histograms etc. can be constructed to withstand significant levels of compression, and still be sensitive enough to detect even a small modification of the image. Signatures may be constructed as either reversible or irreversible transformations, though the use of the latter tends to enhance the speed of the overall process.

The above-stated signature goals may be achieved by constructing the image signatures using image projection on the specified axis. The image is thresholded first and the number of foreground pixels is calculated for every point on the given axis, thus creating a signature. To make the signature more robust relative to compression losses, the image can be divided into a predefined number of stripes and the number of foreground pixels is then calculated for each stripe, instead of for each point on the axis. The calculated values are normalized to keep the signature shape independent of the image size. To improve the sensitivity to image modification, projections on several different axes can be used.

The image signature calculated by the server software module may be based on compressed images received from the client software module, which in some embodiments of the invention may be compressed JPEG images. The image signature calculated by the encoding module uses original, uncompressed files. This may result in reduced processing time and simplified communication between the user interface, remoting code, and image processing code that creates the encoded image. This may further result in a small difference in values between client and server generated signatures that has to be accounted for during the signature comparison. The absolute value of the error is calculated for every value of the signature. These error values are then normalized and the mean is calculated. If the mean error is bigger than the predefined tolerance level, the images are considered to be corrupted or swapped. This results in the validation step failing and an error message returned.

In some embodiments of the invention, the thumbnail images being sent to the software server module may be packed together into a single data structure before being sent by the client software module. This assures that the digital information is all received by the server at the same time. Similarly, the signatures created by the validation module for all images may be packed together into one data structure before being sent back to the user computer.

In some embodiments, when the server software determines that a request is not valid, the validation module may assign a default signature, such as zero, that will not match any signature created by the encoding module. This results in the encoding module denying any processing of the encoded image.

The use of a security key in some embodiments may allow the use of symmetric key encryption in the transfer of information across the network. This may be advantageous in providing faster communications while still keeping the data encrypted.

Yet another level of protection that may be instituted individually or in combination with the other discussed security features is a secure Internet connection, such as a Secure Sockets Layer, to provide secure communications between the client software module and the validation module.

Additional security features may be implemented, such as using two separate servers to perform the functions of the validation module. For example, a first server may be a web server, separated from all client-side modules (the client software module and in some cases, the encoding module) by a firewall. The web server is the initial server with which the client software module communicates when sending a request for remote verification. The web server may also be used to add new records to the database. The web server may then be connected to a second server through another firewall. The second server is the database server that provides the primary data storage used to verify and authorize the creation of encoded images by the client. Although the use of two servers may be advantageous in some circumstances, it will be understood that this is not required and the database server and the web server could in fact be a single computer with no firewall protection between them.

It will be understood that communications channel and data formatting for remote transmission of data may vary depending on the desired functionality of the system. Typical protocols for the transmission of data include HTTP and TCP. The use of TCP may result in significantly faster transmission, although third party or client firewalls and proxy servers may hinder or block TCP communications, such that HTTP may be an acceptable or even preferable alternative in Internet environments. Data formatters may include SOAP, binary or custom formatters.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. An automated method for authorizing and controlling the production of optically encoded images, the method comprising:

receiving from a user data processor a request for authorization to produce an encoded image, the authorization request including user-supplied data comprising at least one authentication image file;

determining whether the user is authorized to produce an encoded image using the user-supplied data;

responsive to a determination that the user is authorized to produce an encoded image using the user-supplied data, generating an authentication image signature from the at least one authentication image file using an image signature algorithm and returning a positive authorization response to the user data processor, the positive authorization response including the authentication image signature, wherein the user-supplied data comprises a user-supplied encoding parameter and the action of determining whether the user is authorized to produce an encoded image using the user-supplied data includes determining whether the user-supplied data meets predetermined authorization criteria for the user, the predetermined authorization criteria including a limiting range on the user-supplied encoding parameter.

2. An automated method according to claim 1 wherein the action of determining whether the user is authorized to produce an encoded image using the user-supplied data is carried out by a validation server in communication with the user data processor over a network.

3. An automated method according to claim 1 wherein the at least one authentication image file comprises a thumbnail authentication image formed by compressing an uncompressed authentication image and wherein the authentication image signature is generated from the thumbnail authentication image.

4. An automated method according to claim 3 wherein the image signature algorithm is adapted so that the authentication image signature generated from the thumbnail authentication image will match within a predetermined tolerance range a comparison image signature generated from the uncompressed authentication image using the image signature algorithm.

5. An automated method according to claim 1 wherein the image signature is adapted for use by an image encoding module to validate a request for an encoded image, the image encoding module being in communication with the user data processor and being adapted for receiving from a client software module on the user data processor an uncompressed authentication image and the authentication image signature, generating a comparison image signature from the uncompressed authentication image using the image signature algorithm, comparing the comparison image signature to the authentication image signature, and responsive to a determination that the comparison image signature matches the authentication image signature within a predetermined tolerance range, initiating the production of an encoded image using the uncompressed authentication image.

6. An automated method for producing optically encoded images, the method comprising:

receiving a request from a user for an encoded image;

receiving an authentication image to be used to produce the encoded image;

receiving at least one encoding parameter to be used to produce the encoded image;

sending to a validation module a request for authorization to produce an encoded image, the request for authorization including an authentication image file and the at least one encoding parameter, the authentication image file including at least one of the group consisting of a compressed version of the authentication image and an uncompressed version of the authentication image;

receiving an authorization response from the validation module, the authorization response including an authentication image signature;

generating a comparison image signature from the authentication image using an image signature algorithm;

comparing the comparison image signature to the authentication image signature to determine if the comparison image signature matches the authentication image signature within a predetermined tolerance range; and responsive to a determination that the comparison image signature matches the authentication image signature within the predetermined tolerance range, producing an encoded image using the authentication image, wherein the validation module is part of a validation server and the actions of receiving a request from a user, receiving an authentication image, receiving at least one encoding parameter, sending a request for authorization, receiving an authorization response, generating a comparison image signature, comparing the comparison image signature to the authentication image signature, and producing an encoded image are carried out by a user data processor in selective communication with the validation server over a network.

7. An automated method according to claim 6 wherein the validation module is part of a validation server and the actions of receiving a request from a user, receiving an authentication image, receiving at least one encoding parameter, sending a request for authorization, and receiving an authorization response are carried out on a user data processor in selective communication with the validation server over a first network and wherein the actions of generating a comparison image signature, comparing the comparison image signature to the authentication image signature, and producing an encoded image are carried out by an encoding module on an encoding processor in selective communication with the user data processor over a second network that may be the same as the first network, the method further comprising:

sending a request for an encoded image from the user data processor to the encoding processor, the request for an encoded image including the authentication image file, the at least one encoding parameter and the authentication image signature.

8. An automated method according to claim 6 further comprising:

compressing the authentication image to form a compressed authentication image; and storing the compressed authentication image in the authentication image file.

9. An automated method according to claim 8 wherein the image signature algorithm is adapted so that if the authentication image signature was generated from the compressed version of the authentication image using the image signature algorithm, the comparison image signature will match the authentication image signature within the predetermined tolerance range.

10. An automated system for authorizing and producing optically encoded images, the system comprising:

a validation module resident on a first data processor, the validation module being adapted for receiving an image encoding authorization request from a requestor, the request including user-supplied data comprising an authentication image file and at least one encoding parameter, for determining whether the user is authorized to produce an encoded image using the user-supplied data, for generating an authentication image signature from the authentication image file using an image signature algorithm, and for returning an authorization response to the requestor, the authorization response including the authentication image signature;

a client software module resident on a second data processor in selective communication with the first data processor over a network, the client software module being adapted for receiving a request for an encoded image from a user, for receiving an authentication image to be used for encoding the encoded image, for sending the image encoding authorization request to the validation module, and for receiving the authorization response from the validation module;

an encoding module in selective communication with the client software module, the encoding module being adapted for receiving the authentication image, the at least one encoding parameter and the authentication image signature from the client software module, for generating a comparison image signature from the authentication image using the image signature algorithm, for comparing the comparison image signature with the authentication image signature to determine if the comparison image signature matches the authentication image signature within a predetermined tolerance range, and for producing the requested encoded image using the authentication image and the at least one encoding parameter responsive to a determination that the comparison image signature matches the authentication image signature within the predetermined tolerance range.

11. An automated system according to claim 10 wherein authentication image file comprises a thumbnail authentication image formed by compressing an uncompressed authentication image and wherein the authentication image signature is generated from the thumbnail authentication image.

12. An automated system according to claim 11 wherein the image signature algorithm is adapted so that the authentication image signature generated from the thumbnail authentication image will match within a predetermined tolerance range a comparison image signature generated from the uncompressed authentication image using the image signature algorithm.

13. An automated method for authorizing and controlling the production of optically encoded images, the method comprising:

receiving from a user data processor a request for authorization to produce an encoded image, the authorization request including user-supplied data comprising at least one authentication image file;

determining whether the user is authorized to produce an encoded image using the user-supplied data;

responsive to a determination that the user is authorized to produce an encoded image using the user-supplied data, generating an authentication image signature from the at least one authentication image file using an image signature algorithm and returning a positive authorization response to the user data processor, the positive authorization response including the authentication image signature, wherein the at least one authentication image file comprises a thumbnail authentication image formed by compressing an uncompressed authentication image and the authentication image signature is generated from the thumbnail authentication image.

14. An automated method according to claim 13 wherein the image signature algorithm is adapted so that the authentication image signature generated from the thumbnail authentication image will match within a predetermined tolerance range a comparison image signature generated from the uncompressed authentication image using the image signature algorithm.

15. An automated method for authorizing and controlling the production of optically encoded images, the method comprising:
- receiving from a user data processor a request for authorization to produce an encoded image, the authorization request including user-supplied data comprising at least one authentication image file;
- determining whether the user is authorized to produce an encoded image using the user-supplied data;
- responsive to a determination that the user is authorized to produce an encoded image using the user-supplied data, generating an authentication image signature from the at least one authentication image file using an image signature algorithm and returning a positive authorization response to the user data processor, the positive authorization response including the authentication image signature,
- wherein the image signature is adapted for use by an image encoding module to validate a request for an encoded image, the image encoding module being in communication with the user data processor and being adapted for:
  - receiving from a client software module on the user data processor an uncompressed authentication image and the authentication image signature,
  - generating a comparison image signature from the uncompressed authentication image using the image signature algorithm,
  - comparing the comparison image signature to the authentication image signature, and
  - responsive to a determination that the comparison image signature matches the authentication image signature within a predetermined tolerance range, initiating the production of an encoded image using the uncompressed authentication image.

16. An automated method for producing optically encoded images, the method comprising:
- receiving on a user data processor a request from a user for an encoded image;
- receiving on the user data processor an authentication image to be used to produce the encoded image;
- receiving on the user data processor at least one encoding parameter to be used to produce the encoded image;
- sending from the user data processor to a validation module a request for authorization to produce an encoded image, wherein the validation module is part of a validation server in selective communication with the user data processor over a first network, the request for authorization includes an authentication image file and the at least one encoding parameter, and the authentication image file includes at least one of the group consisting of a compressed version of the authentication image and an uncompressed version of the authentication image;
- receiving on the user data processor an authorization response from the validation module, the authorization response including an authentication image signature;
- sending a request for an encoded image from the user data processor to an encoding module on an encoding processor in selective communication with the user data processor over a second network that may be the same as the first network, the request for an encoded image including the authentication image file, the at least one encoding parameter and the authentication image signature;
- generating on the encoding module a comparison image signature from the authentication image using an image signature algorithm, the encoding processor being;
- comparing on the encoding module the comparison image signature to the authentication image signature to determine if the comparison image signature matches the authentication image signature within a predetermined tolerance range;
- responsive to a determination that the comparison image signature matches the authentication image signature within the predetermined tolerance range, producing on the encoding module an encoded image using the authentication image.

17. An automated method according to claim 16 further comprising:
- compressing the authentication image to form a compressed authentication image; and
- storing the compressed authentication image in the authentication image file.

18. An automated method according to claim 17 wherein the image signature algorithm is adapted so that if the authentication image signature was generated from the compressed version of the authentication image using the image signature algorithm, the comparison image signature will match the authentication image signature within the predetermined tolerance range.

19. An automated method for producing optically encoded images, the method comprising:
- receiving a request from a user for an encoded image;
- receiving an authentication image to be used to produce the encoded image;
- receiving at least one encoding parameter to be used to produce the encoded image;
- sending to a validation module a request for authorization to produce an encoded image, the request for authorization including an authentication image file and the at least one encoding parameter, the authentication image file including at least one of the group consisting of a compressed version of the authentication image and an uncompressed version of the authentication image;
- receiving an authorization response from the validation module, the authorization response including an authentication image signature;
- generating a comparison image signature from the authentication image using an image signature algorithm;
- comparing the comparison image signature to the authentication image signature to determine if the comparison image signature matches the authentication image signature within a predetermined tolerance range;
- responsive to a determination that the comparison image signature matches the authentication image signature within the predetermined tolerance range, producing an encoded image using the authentication image;
- compressing the authentication image to form a compressed authentication image; and
- storing the compressed authentication image in the authentication image file,
- wherein the image signature algorithm is adapted so that if the authentication image signature was generated from the compressed version of the authentication image using the image signature algorithm, the comparison image signature will match the authentication image signature within the predetermined tolerance range.

* * * * *